United States Patent
Nishimura

(10) Patent No.: US 9,727,121 B2
(45) Date of Patent: Aug. 8, 2017

(54) WIRELESS COMMUNICATION DEVICE

(71) Applicant: KABUSHIKI KAISHA TOSHIBA, Tokyo (JP)

(72) Inventor: Ko Nishimura, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/836,883

(22) Filed: Aug. 26, 2015

(65) Prior Publication Data
US 2016/0259396 A1    Sep. 8, 2016

(30) Foreign Application Priority Data

Mar. 3, 2015 (JP) ................................. 2015-041613

(51) Int. Cl.
| | |
|---|---|
| G06F 1/32 | (2006.01) |
| G06F 1/26 | (2006.01) |
| G06F 1/00 | (2006.01) |
| H04W 4/00 | (2009.01) |
| H04W 52/02 | (2009.01) |

(52) U.S. Cl.
CPC .......... *G06F 1/3275* (2013.01); *G06F 1/3237* (2013.01); *H04W 4/008* (2013.01); *H04W 52/028* (2013.01); *G06F 1/26* (2013.01); *Y02B 60/50* (2013.01)

(58) Field of Classification Search
CPC ..................................... G06F 1/32; G06F 1/26
See application file for complete search history.

(56) References Cited

U.S. PATENT DOCUMENTS

| | | | | |
|---|---|---|---|---|
| 6,128,747 A | * | 10/2000 | Thoulon ............... | G06F 1/3203 713/300 |
| 2009/0172423 A1 | * | 7/2009 | Song ..................... | G06F 1/3203 713/300 |
| 2010/0153761 A1 | * | 6/2010 | Nishioka ............... | G06F 1/3203 713/323 |
| 2010/0162014 A1 | * | 6/2010 | Memon ................. | G06F 9/4812 713/320 |
| 2010/0185821 A1 | * | 7/2010 | Paver ................... | G06F 12/0831 711/146 |

(Continued)

FOREIGN PATENT DOCUMENTS

JP            2010211351 A          9/2010

*Primary Examiner* — Phil Nguyen
(74) *Attorney, Agent, or Firm* — Patterson & Sheridan, LLP

(57) ABSTRACT

A wireless communication device includes a processor, a memory unit capable of retaining data in a power saving state, a clock control unit configured to control when a clock is to be supplied to each pair of processor and memory, and a power control unit configured to control an amount of power to be supplied to the processor and the memory unit. In the power saving state, the clock control unit stops supplying the clock to the processor and the memory unit, and the power control unit reduces the amount of power supplied to the memory unit. When returning from the power saving state, the power control unit increases the amount of power supplied to the memory unit, and the clock control unit starts supplying the clock to the memory unit before starting to supply the clock to the processor.

18 Claims, 6 Drawing Sheets

(56) References Cited

U.S. PATENT DOCUMENTS

| | | | |
|---|---|---|---|
| 2010/0185833 A1* | 7/2010 | Saito | G06F 1/3203 |
| | | | 712/203 |
| 2010/0308876 A1 | 12/2010 | Kawasaki et al. | |
| 2011/0157195 A1* | 6/2011 | Sprangle | G06T 1/20 |
| | | | 345/522 |
| 2011/0185126 A1* | 7/2011 | Sasaki | G06F 12/0837 |
| | | | 711/124 |
| 2012/0218512 A1 | 8/2012 | Archambeau et al. | |
| 2014/0089603 A1* | 3/2014 | Krishnapura | G06F 12/0831 |
| | | | 711/146 |
| 2014/0250312 A1* | 9/2014 | Reinhardt | G06F 9/542 |
| | | | 713/320 |

\* cited by examiner

WIRELESS COMMUNICATION DEVICE

CROSS-REFERENCE TO RELATED APPLICATION

This application is based upon and claims the benefit of priority from Japanese Patent Application No. 2015-041613, filed Mar. 3, 2015, the entire contents of which are incorporated herein by reference.

FIELD

Embodiments described herein relate generally to a wireless communication device.

BACKGROUND

In the related art, there is a wireless communication device capable of performing wireless communication such as by Bluetooth®. When communication with an external device is not performed for a certain time period in the wireless communication device, power saving control in which a communication function is turned off is performed by stopping a driving clock or reducing the supply of power. The transition to a power saving state is performed even in a memory unit provided within the wireless communication device while retaining data. At the time of returning from the power saving state, the return to a state before the transition to the power saving state is performed by returning the driving clock and the amount of supplied power to an original value.

However, in some conditions at the time of transition to the power saving state, the return to the state before the power saving state is not performed in some cases. Specifically, when the transition to the power saving state is performed during a read sequence on the memory unit, undefined data may be output as read data from the memory unit at the time of returning to the former state in some cases. Such undefined data can cause unpredictable behavior. Accordingly, there is a need for a technology capable of appropriately returning from the power saving state.

DETAILED DESCRIPTION

Embodiments provide a wireless communication device capable of appropriately returning from a power saving state.

In general, according to one embodiment, a wireless communication device includes a plurality of processors, a plurality of memory units, each of which is paired with one of the processors, and is capable of retaining data in a power saving state, a clock control unit configured to control when a clock is to be supplied to each pair of the processor and the memory unit, and a power control unit configured to control an amount of power to be supplied to each pair of the processor and the memory unit. In the power saving state, the clock control unit stops supplying the clock to each pair of the processor and the memory unit, and the power control unit reduces the amount of power supplied to the memory unit, and when returning from the power saving state to a normal power state, the power control unit increases the amount of power supplied to the memory unit to a normal level, and the clock control unit starts supplying the clock to the memory unit before starting to supply the clock to the processor.

Hereinafter, a wireless communication device according to example embodiments is described with reference to the drawings.

First Embodiment

Figure 1:
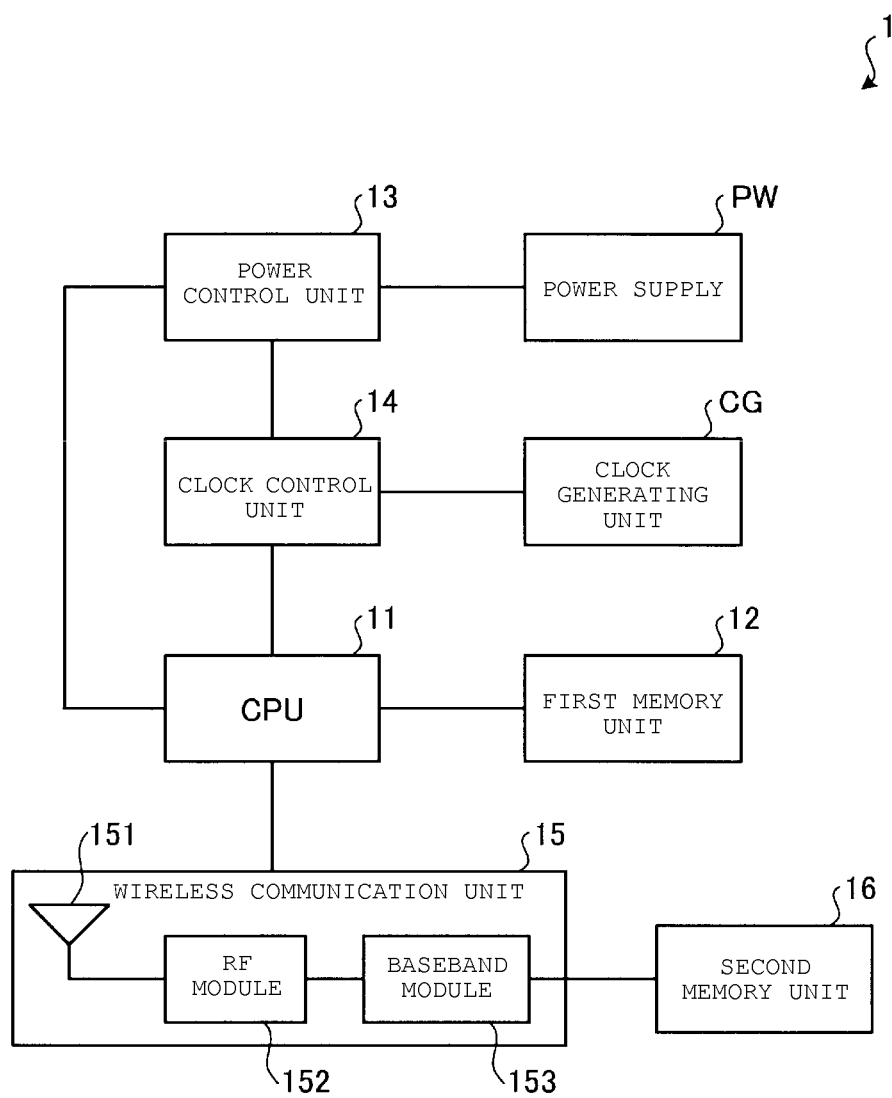
FIG. 1 is a diagram showing an example of the schematic configuration of a wireless communication device according to a first embodiment.

FIG. 1 is a diagram showing an example of the schematic configuration of a wireless communication device according to a first embodiment. A wireless communication device 1 is a wireless communication device capable of performing wireless communication such as Bluetooth®. As shown in FIG. 1, the wireless communication device 1 includes the following hardware elements: a central processing unit (CPU) 11, a first memory unit 12, a power control unit 13, a clock control unit 14, a wireless communication unit 15, and a second memory unit 16.

The central processing unit (CPU) 11 executes a control program stored in a non-illustrated ROM, and collectively controls the operations of the respective units configuring the wireless communication device 1.

The first memory unit 12 is a storage unit capable of retaining data in a power saving state in which power consumption is reduced. In the present embodiment, the first memory unit 12 is a static random access memory (SRAM) having a retention mode, and functions as, for example, a cache memory or a work memory for the CPU 11. Hereinafter, the SRAM having the retention mode is referred to as a data retention SRAM.

The power control unit 13 performs control such that power supplied from a power supply PW, is supplied to the respective units of the wireless communication device 1. For example, the power control unit 13 performs control such that the supply of power to a peripheral module 122 of the first memory unit 12, to be described below, is turned on or off.

The clock control unit 14 performs control such that clocks (clock signals) generated in a clock generating unit CG are supplied to the respective units of the wireless communication device 1. For example, the clock control unit 14 supplies a processor clock for operating the CPU 11 to the CPU 11. The clock control unit 14 supplies a memory clock for operating the first memory unit 12 or the second memory unit 16 to the first memory unit 12 or the second memory unit 16. The clock control unit 14 performs control such that the supply of the clocks to the CPU 11, the first memory unit 12 or the second memory unit 16 is turned on or off.

The wireless communication unit 15 is a communication interface for wireless communication conformable to a communication standard such as Bluetooth (registered trademark). As shown in FIG. 1, the wireless communication unit 15 includes an antenna 151, a radio frequency (RF) module 152, and a baseband module 153.

The antenna 151 transmits or receives data (signal) to or from an external device. The RF module 152 converts the frequency of data to be transmitted or received. The baseband module 153 includes a non-illustrated processor, performs demodulation and decoding on the received data, and performs modulation and encoding on data to be transmitted.

The second memory unit 16 is a storage unit capable of retaining data in a power saving state where power consumption is reduced. In the present embodiment, the second memory unit 16 is the same data retention SRAM as that of the first memory unit 12, and functions as a cache memory or a work memory for the wireless communication unit 15 (baseband module 153).

Here, the relationship between the wireless communication unit 15 and the second memory unit 16 corresponds to the relationship between the CPU 11 and the first memory unit 12. Specifically, the baseband module (processor) 153 of the wireless communication unit 15 corresponds to the CPU 11, and the second memory unit 16 corresponds to the first memory unit 12.

Figure 2:
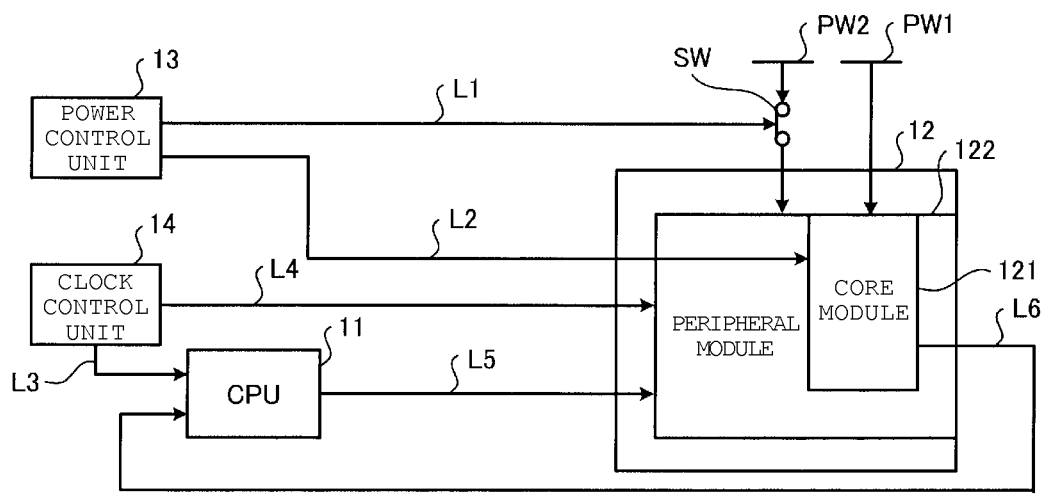
FIG. 2 is a diagram showing an example of a control configuration related to power saving control in the wireless communication device according to the first embodiment.

Next, a control configuration related to power saving control in the wireless communication device 1 according to the present embodiment is described. FIG. 2 is a diagram showing an example of the control configuration related to the power saving control in the wireless communication device 1 according to the present embodiment, and depicts the control configuration between the CPU 11, the first memory unit 12, the power control unit 13 and the clock control unit 14.

As shown in FIG. 2, the first memory unit 12 which is the data retention SRAM includes a core module 121, and the peripheral module 122. The core module 121 includes a memory array for retaining data. The peripheral module 122 includes a peripheral circuit of the core module 121 such as a decoder for accessing the core module 121 or a sense amplifier that amplifies the electrical potential of output data.

Power is supplied from a core-module power supply PW1 to the core module 121 under the control of the power control unit 13. Power is supplied from a peripheral-module power supply PW2 to the peripheral module 122 under the control of the power control unit 13. A switch SW is provided on a power supply line between the peripheral module 122 and the peripheral-module power supply PW2. The power control unit 13 is configured to turn on or off the supply of power to the peripheral module 122 by switching the switch SW through a signal line L1.

A signal line L2 is connected between the power control unit 13 and the core module 121 of the first memory unit 12. The power control unit 13 outputs a signal (retention trigger) for instructing that the transition (turn-on) to the retention mode or the release (turn-off) from the retention mode be performed to the core module 121 through the signal line L2.

The core module 121 performs the transition to the retention mode in which the core module operates at a voltage value (low voltage) that does not erase data in response to the transition instruction to the retention mode. The core module 121 voltage is returned to a normal voltage value before being released from the retention mode in response to the release instruction.

The clock control unit 14 supplies the processor clock for operating the CPU 11 to the CPU 11 through a signal line L3. The clock control unit 14 supplies the memory clock for operating the peripheral module 122 of the first memory unit 12 to the peripheral module 122 through a signal line L4. The CPU 11 and the first memory unit 12 perform the operations in synchronization with the supplied processor clock and memory clock.

The CPU 11 and the first memory unit 12 (peripheral module 122) are connected through various signal lines L5 such as a data input bus, a command input bus, or an address input bus. The peripheral module 122 of the first memory unit 12 writes data in the core module 121 or reads data from the core module 121 in response to a signal value input from the CPU 11. The data read from the core module 121 is output to the CPU 11 through a data output bus L6.

In the configuration of FIG. 2, when the transition instruction to the power saving state is received, the power control unit 13 performs the transition of the CPU 11 and the first memory unit 12 to the power saving state in cooperation with the clock control unit 14. For example, when the CPU 11 does not access the first memory unit 12 for a predetermined time period, the CPU 11 may transmit the transition instruction to the power saving state. Alternatively, a non-illustrated external device may transmit the transition instruction to the power saving state. Alternatively, the power control unit 13 may transmit the transition instruction to the power saving state through timer control.

When a return instruction from the power saving state is received, the power control unit 13 performs the transition (return) of the CPU 11 and the first memory unit 12 to a state before the transition of the CPU 11 and the first memory unit 12 to the power saving state in cooperation with the clock control unit 14. For example, a non-illustrated external device may transmit the return instruction from the power saving state. Alternatively, the power control unit 13 may voluntarily transmit the return instruction from the power saving state through timer control.

Figure 3:
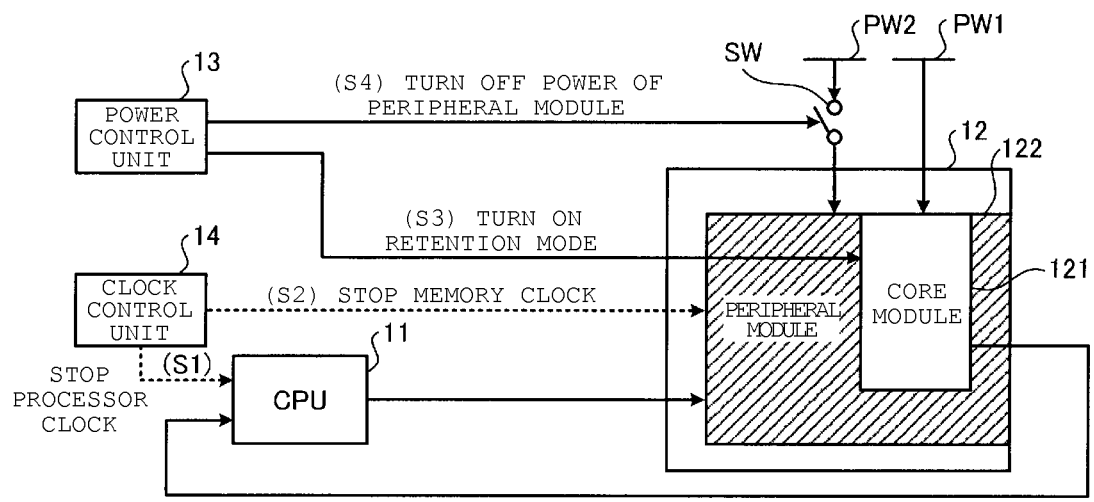
FIG. 3 is a diagram for describing an example of transition control to a power saving state in the wireless communication device according to the first embodiment.

FIG. 3 is a diagram for describing an example of transition control to the power saving state in the wireless communication device 1 according to the present embodiment. When the transition instruction to the power saving state is received, the clock control unit 14 stops the processor clock to the CPU 11 (step S1). In this case, since the supply of the power to the CPU 11 is maintained, the operation of the CPU 11 is in a stopped state, and the input value (command or address) of the signal line L5 is retained.

The clock control unit 14 stops the memory clock to the first memory unit 12 (peripheral module 122) (step S2). The power control unit 13 outputs a retention trigger for instructing that the transition to the retention mode be performed to the first memory unit 12 (core module 121) (step S3). Thus, the operation of the core module 121 of the first memory unit 12 is switched to the retention mode.

The power control unit 13 blocks the supply of the power to the peripheral module 122 by turning off the switch SW (step S4), and reduces the amount of power supplied to the entire first memory unit 12. Thus, since the power consumption of the CPU 11 and the first memory unit 12 is reduced while retaining the data of the first memory unit 12 (core module 121), it is possible to achieve power saving in the wireless communication device 1.

The return (restore) from the power saving state is realized by turning on the switch SW, releasing the retention mode and starting (resuming) the clocks in reverse order of steps S1 to S4.

Immediately after the supply of the power in the first memory unit 12 is started (resumed), the peripheral module 122 is in an undefined state, which causes the value of the data output bus to become undefined. For example, when the transition to the power saving state is performed during the read sequence on the first memory unit 12, data of an undefined value is likely to be sent to the CPU 11 at the time of returning from the power saving state. The operation in this case is described as a comparative example of the present embodiment by referring to FIG. 4.

Figure 4:
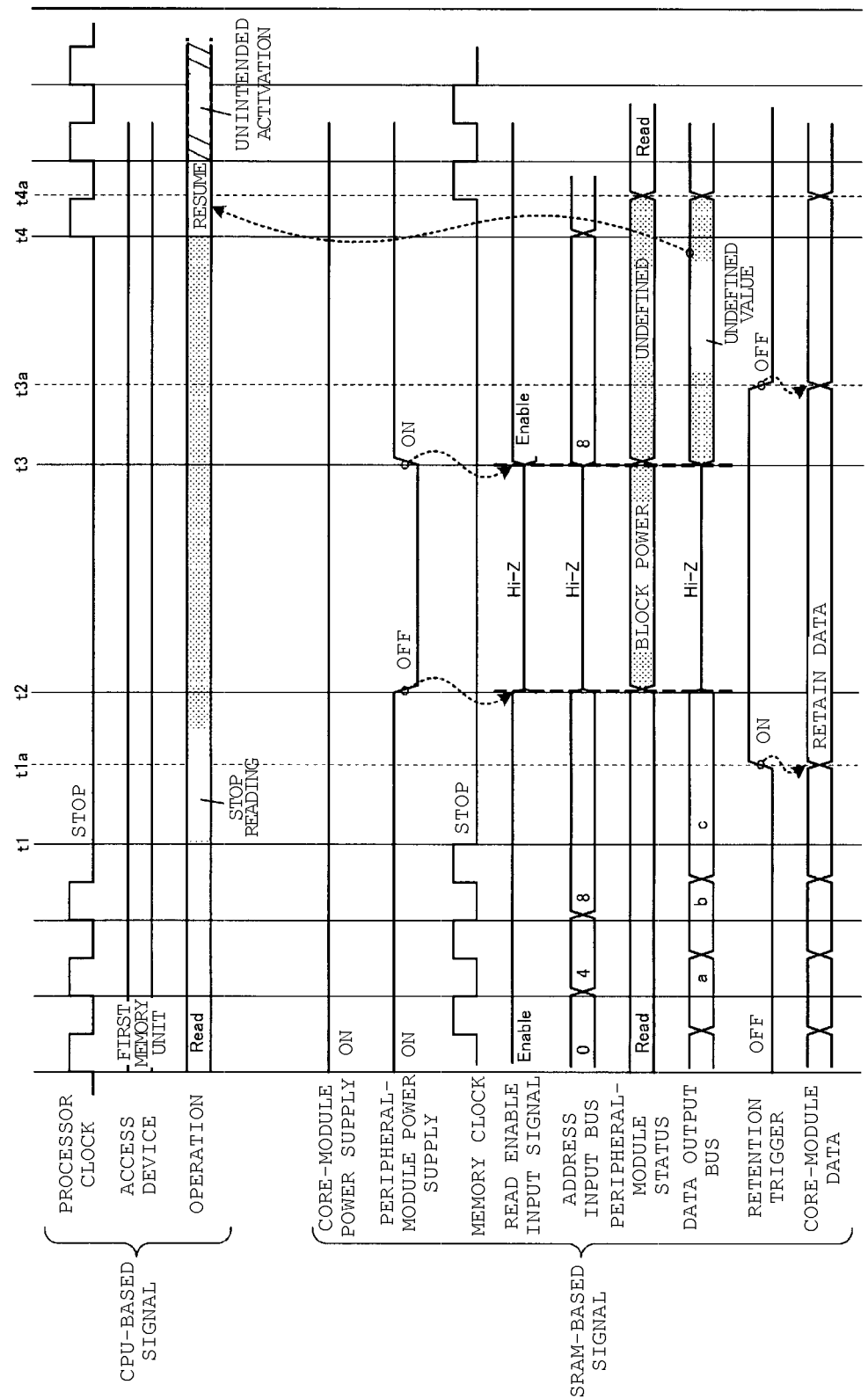
FIG. 4 is a timing chart showing an example of operations at the time of transition to a power saving state and at the time of returning from the power saving state in a comparative example.

FIG. 4 is a timing chart depicting an example of the operations at the time of transition to a power saving state and at the time of returning from the power saving state in the comparative example. In the drawing, a read operation (read sequence) is performed up to a time t1, a transition operation to a power saving state is performed from the time t1 to a time t2, and a return operation from the power saving state is performed from a time t3 to a time t4.

First, the CPU 11 performs a read access onto the first memory unit 12 in synchronization with the processor clock. In this case, the CPU 11 accesses the first memory unit 12 by generating a read enable signal to the command input bus and providing addresses (0, 4, and 8) which are read destinations to the address input bus.

Meanwhile, in the first memory unit 12, power is supplied to the core module 121 and the peripheral module 122, and the peripheral module 122 operates in synchronization with the memory clock. The peripheral module 122 is in a read state in response to the input of the read enable signal, and reads data items from the addresses "0", "4", and "8" of the first memory unit 12 provided by the address input bus. Data items "a", "b", and "c" read from the addresses are sequentially output to the CPU 11 through the data output bus L6.

When the transition instruction to the power saving state is received at the time t1 when the data "c" is output, the clock control unit 14 stops the processor clock, and stops the memory clock. Thus, the read sequence is stopped in the CPU 11 and the first memory unit 12.

Thereafter, at a time t1a, when the retention trigger for instructing the transition to the retention mode is output from the power control unit 13, the operation of the core module 121 is switched to the retention mode in which the data is retained. At the time t2, when the power control unit 13 switches the switch SW off, the supply of the power to the peripheral module 122 is blocked, and thus, the transition to the power saving state is complete. By completing the transition to the power saving state, in the first memory unit 12, the read enable signal and the address input bus have high impedance. The data output bus also has high impedance.

In the power saving state, when the return instruction from the power saving state is received at the time t3, the power control unit 13 switches the switch SW on, and thus, the supply of the power to the peripheral module 122 is started. Subsequently, at a time t3a, when the power control unit 13 outputs the retention trigger for instructing that the retention mode be released, the core module 121 releases the retention mode.

At the time t4, the processor clock and the memory clock are supplied to the CPU 11 and the first memory unit 12 (peripheral module 122). Thereafter, in the CPU 11 and the first memory unit 12, the read sequence, which was being performed before the transition to the power saving state was performed, is resumed.

Focusing on the state of the peripheral module 122, immediately after the time t3, that is, immediately after the supply of the power is started, the peripheral module 122 is in an undefined state, and the data output bus also becomes undefined. The undefined state of the peripheral module 122 continues until a time t4a at which the state of the peripheral module 122 is defined (stabilized) even after the supply of the memory clock is started.

Meanwhile, in the CPU 11, when the processor clock is started at the time t4, the stopped read sequence is resumed. However, if the read sequence is performed until the time t4a when the state of the peripheral module 122 is defined, the CPU 11 may read the undefined data output from the first memory unit 12. In this case, unpredictable behavior may be caused in the CPU 11 by reading the undefined data, and there is a possibility that the return to the state before the transition to the power saving state is not performed, that is, the read sequence is not resumed.

Thus, in the wireless communication device 1 according to the present embodiment, the clock control unit 14 performs control such that the state of the peripheral module 122 is defined before the read sequence by the CPU 11 is resumed by supplying a return clock to the first memory unit 12 before the processor clock is supplied. Hereinafter, the operation at the time of returning in the present embodiment is described with reference to FIG. 5.

Figure 5:
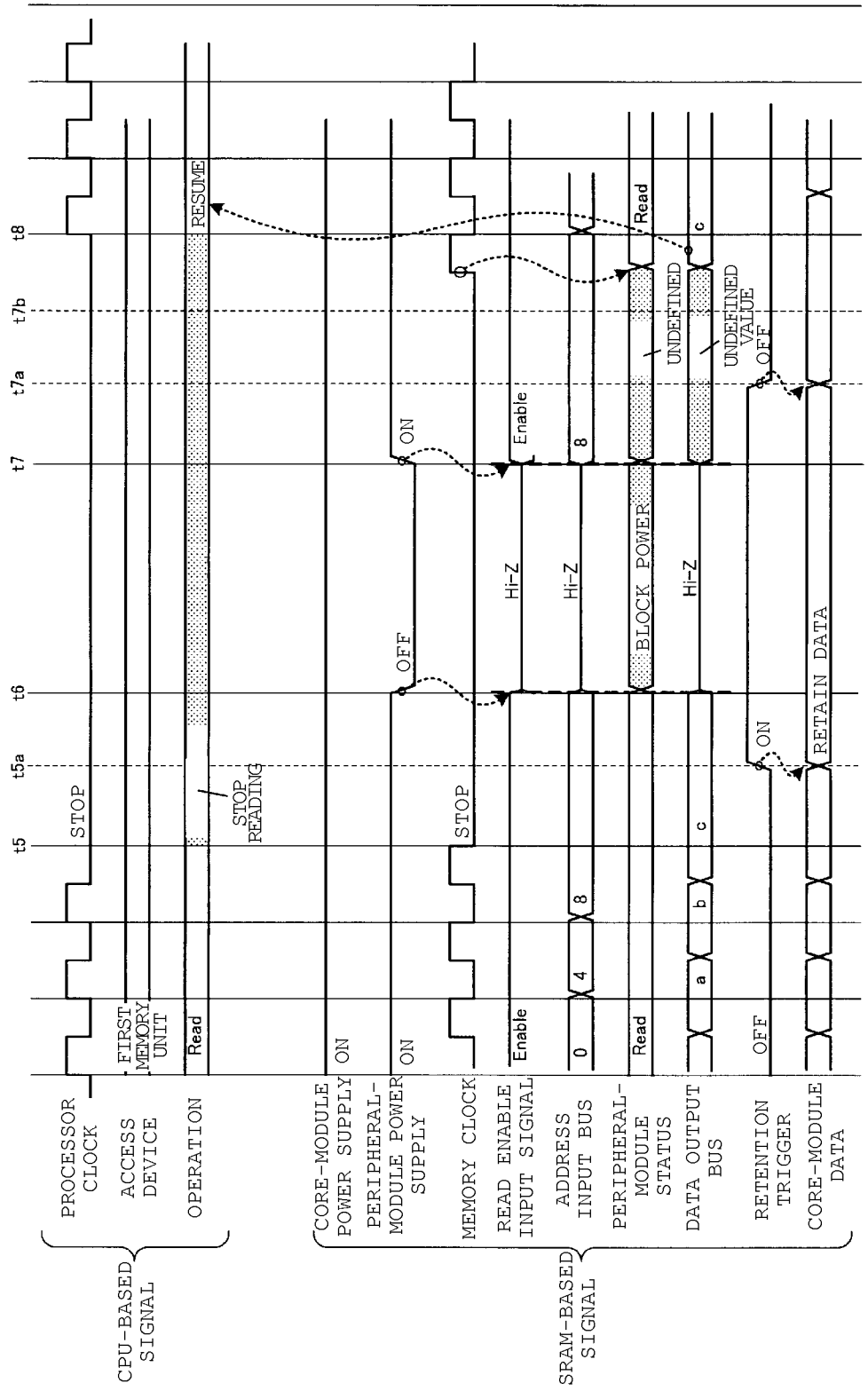
FIG. 5 is a timing chart showing an example of operations at the time of transition to the power saving state and at the time of returning from the power saving state in the wireless communication device according to the first embodiment.

FIG. 5 is a timing chart showing an example of the operations at the time of transition to the power saving state and at the time of returning from the power saving state in the wireless communication device 1 according to the present embodiment. In the drawing, a read operation (read sequence) is performed up to time t5, a transition operation to the power saving state is performed from the time t5 to a time t6, and a return operation from the power saving state is performed from a time t7 to a time t8. The operation up to the time t7 is the same as the operation up to the time t3 described in FIG. 4, and thus, the description thereof is omitted.

At the time t7, when the return instruction from the power saving state is received, the power control unit 13 starts the supply of the power to the peripheral module 122 by switching the switch SW on. Subsequently, the power control unit 13 outputs the retention trigger for instructing that the retention mode be released to the core module 121 at a time t7a.

Subsequently, the clock control unit 14 returns the first memory unit 12 (peripheral module 122) to the state before the transition to the power saving state occurred by starting the memory clock at a time t7b. The clock control unit 14 returns the CPU 11 to the state before the transition to the power saving state occurred by starting the processor clock at the time t8. In the CPU 11 and the first memory unit 12, the read sequence, which was being performed before the transition to the power saving state, is resumed.

Focusing on the state of the peripheral module 122, immediately after the time t7, that is, immediately after the supply of the power is started, the peripheral module 122 is in an undefined state, and the data output bus is also undefined. However, in the configuration of the present embodiment, since the clock control unit 14 starts the memory clock at the time t7b before the processor clock is supplied, the state of the peripheral module 122 is defined with the memory clock, and the data "c" immediately before the transition to the power saving state occurs is returned to the data output bus L6. Thus, in the read sequence after the time t8, the stopped data read operation is continued.

As stated above, according to the present embodiment, since it is possible to prevent data of an undefined value from being output from the data output bus at the time of returning from the power saving state, it is possible to appropriately return from the power saving state.

In FIG. 5, although one memory clock is antecedently supplied as the return clock before the processor clock is started, the control performed by the clock control unit 14 is not limited thereto. For example, when a time corresponding to multiple clocks is required until the state of the peripheral module 122 is stabilized, the clock control unit 14 can supply memory clocks corresponding to multiple clocks before the processor clock is supplied. A supply starting timing of the memory clock can be set as a specified value, the supply starting timing can be delayed by one clock or a many clocks, and the processor clock can then be started.

Although it has been described in FIG. 5 that the timing (time t7a) at which the retention mode is released and the timing (time t7b) at which the memory clock is started are different times, the release of the retention mode and the start of the memory clock can be performed at the same time. In this case, the clock control unit 14 may start the memory clock in synchronization with the release of the retention mode, for example.

In FIGS. 2 to 5, although the pair of the CPU 11 and the first memory unit 12 has been described, the same control may be performed on the pair of the wireless communication unit 15 and the second memory unit 16. Specifically, similarly to the pair of the CPU 11 and the first memory unit 12, the power control unit 13 performs control such that the transition of the pair of the baseband module 153 and the second memory unit 16 to the power saving state is performed, or performs control such that the pair of the baseband module and the second memory unit is returned from the power saving state by cooperating with the clock control unit 14. The clock control unit 14 may supply the memory clock to the second memory unit 16 before the clock is supplied to the baseband module 153 at the time of returning from the power saving state.

Thus, since it is possible to prevent data of an undefined value from being generated from the data output bus at the time of returning from the power saving state, it is possible to appropriately return from the power saving state. Particularly, when the second memory unit 16 paired with the wireless communication unit 15 is used as the data retention SRAM, it is possible to appropriately and quickly perform the pausing (the transition to the power saving state) or the returning of the wireless communication function.

Although it has been described that the power control unit 13 and the clock control unit 14 individually perform the transition to the power saving state or the return from the power saving state on the pair of the CPU 11 and the first memory unit 12 and the pair of the wireless communication unit 15 (baseband module 153) and the second memory unit 16, the example embodiment is not limited thereto, and the transition or the returning can be performed on the pairs in a coordinated manner. For example, when the transition of the pair of the CPU 11 and the first memory unit 12 to the power saving state is performed, the transition of the pair of the wireless communication unit 15 and the second memory unit 16 to the power saving state can also be performed in a coordinated manner. When the pair of the CPU 11 and the first memory unit 12 is returned from the power saving state, the pair of the wireless communication unit 15 and the second memory unit 16 may also be returned from the power saving state. In this case, the power control unit 13 may perform the transition to the power saving state and the return from the power saving state on the pairs with the same timing or different timings by cooperating with the clock control unit 14.

Second Embodiment

Although it has been described in the first embodiment that the SRAM having the retention mode is used as the first memory unit 12 and the second memory unit 16, the embodiment is not limited thereto, and other storage units can be used. Thus, in the second embodiment, a case is described in which a non-volatile memory, such as a flash memory, is used.

Figure 6:
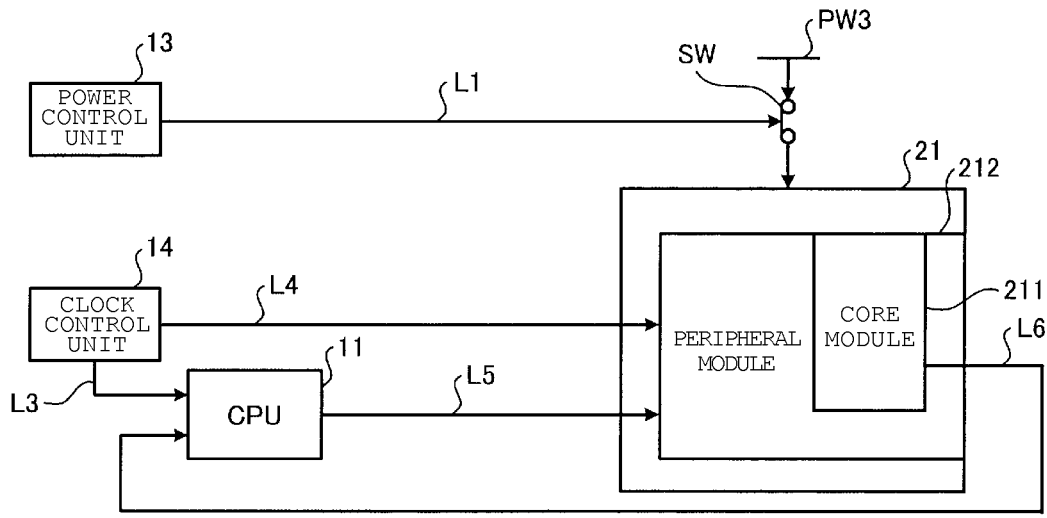
FIG. 6 is a diagram showing an example of a control configuration related to power saving control in a wireless communication device according to a second embodiment.

FIG. 6 is a diagram showing an example of a control configuration related to power saving control in a wireless communication device 1 according to the second embodiment, and is a diagram showing the control configuration between a CPU 11, a power control unit 13, a clock control unit 14, and a third memory unit 21. Here, the third memory unit 21 may be replaced with both or any one of the first memory unit 12 and the second memory unit 16 in the first embodiment.

As shown in FIG. 6, the third memory unit 21 which is a non-volatile memory includes a core module 211, and a peripheral module 212. The core module 211 is a memory array for retaining data. The peripheral module 212 is a peripheral circuit of the core module 211 such as a decoder for accessing the core module 121 or a sense amplifier for amplifying the electrical potential of output data.

Power is supplied from a ROM power supply PW3 to the third memory unit 21 (the core module 211 and the peripheral module 212) under the control of the power control unit 13. A switch SW is provided between the third memory unit 21 and the ROM power supply PW3. The power control unit 13 is configured to turn on or off the supply of the power to the third memory unit 21 by switching the switch SW through a signal line L1.

Other configurations of the CPU 11, the power control unit 13 and the clock control unit 14 with respect to the core module 211 and the peripheral module 212 are the same as those illustrated in FIG. 2 except that a signal line is not required between the power control unit 13 and the core module 211, and thus, the description thereof is omitted.

In the configuration of FIG. 6, when the transition instruction to the power saving state is received, the power control unit 13 performs the transition of the CPU 11 and the third memory unit 21 to the power saving state by cooperating with the clock control unit 14. When the return instruction from the power saving state is received, the power control unit 13 returns the CPU 11 and the third memory unit 21 to the state before the transition to the power saving state occurred by cooperating with the clock control unit 14.

Here, the non-volatile memory may be a retention SRAM that does not require the retention trigger. That is, it may be considered that a state where the retention mode is released in the data retention SRAM is replaced with a power return state of the non-volatile memory.

Figure 7:
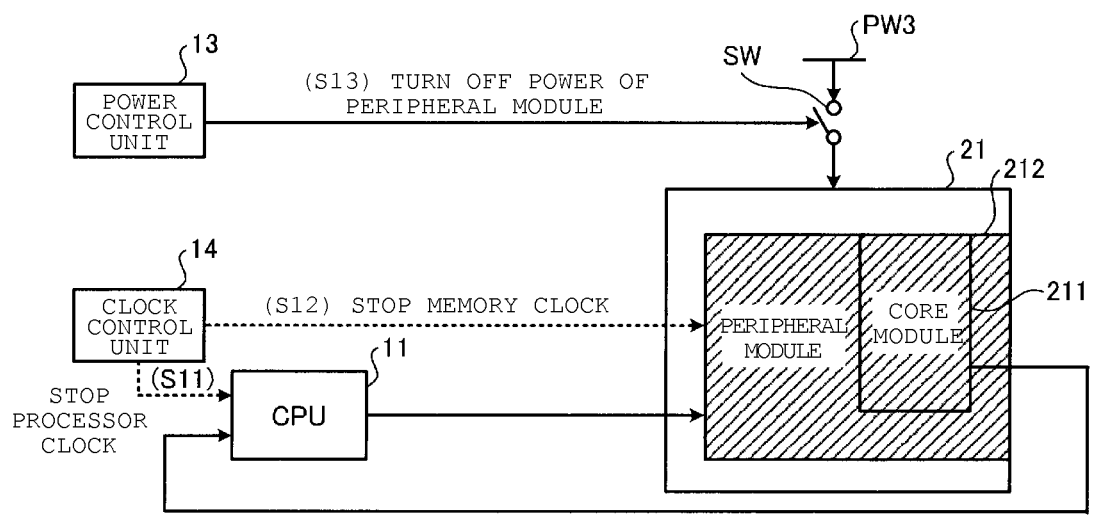
FIG. 7 is a diagram for describing an example of transition control to a power saving state in the wireless communication device according to the second embodiment.

Hereinafter, the control at the time of transition to the power saving state and at the time of returning from the power saving state is described. FIG. 7 is a diagram for describing an example of the transition control to the power saving state in the wireless communication device 1 according to the present embodiment. When the transition instruction to the power saving state is received, the clock control unit 14 stops the processor clock to the CPU 11 (step S11).

In this case, since the supply of the power to the CPU 11 is maintained, the operation of the CPU 11 is in a stopped state.

Subsequently, the clock control unit 14 stops the memory clock to the third memory unit 21 (peripheral module 212) (step S12). The power control unit 13 blocks the supply of the power to the core module 211 and the peripheral module 212 by turning off the switch SW (step S13), and thus, the amount of power supplied to the entire third memory unit 21 is reduced. In this case, since the third memory unit 21 is a non-volatile memory, the data stored in the core module 211 is retained even when the supply of the power is blocked.

The return (restore) from the power saving state may be realized by turning on the switch SW and starting (resuming) the supply of the clock in reverse order of steps S11 to S13.

Incidentally, when the transition to the power saving state is performed during the read sequence of the third memory unit 21, if the CPU 11 and the third memory unit 21 are returned at the same time, the data having the undefined value may be output to the CPU 11 as in the first embodiment.

Thus, similar to the first embodiment, the clock control unit 14 performs control such that the state of the third memory unit 21 is defined before the read sequence is resumed by supplying the return clock to the third memory unit 21 before the processor clock is supplied. Hereinafter, the operation at the time of returning in the present embodiment is described with reference to FIG. 8.

Figure 8:
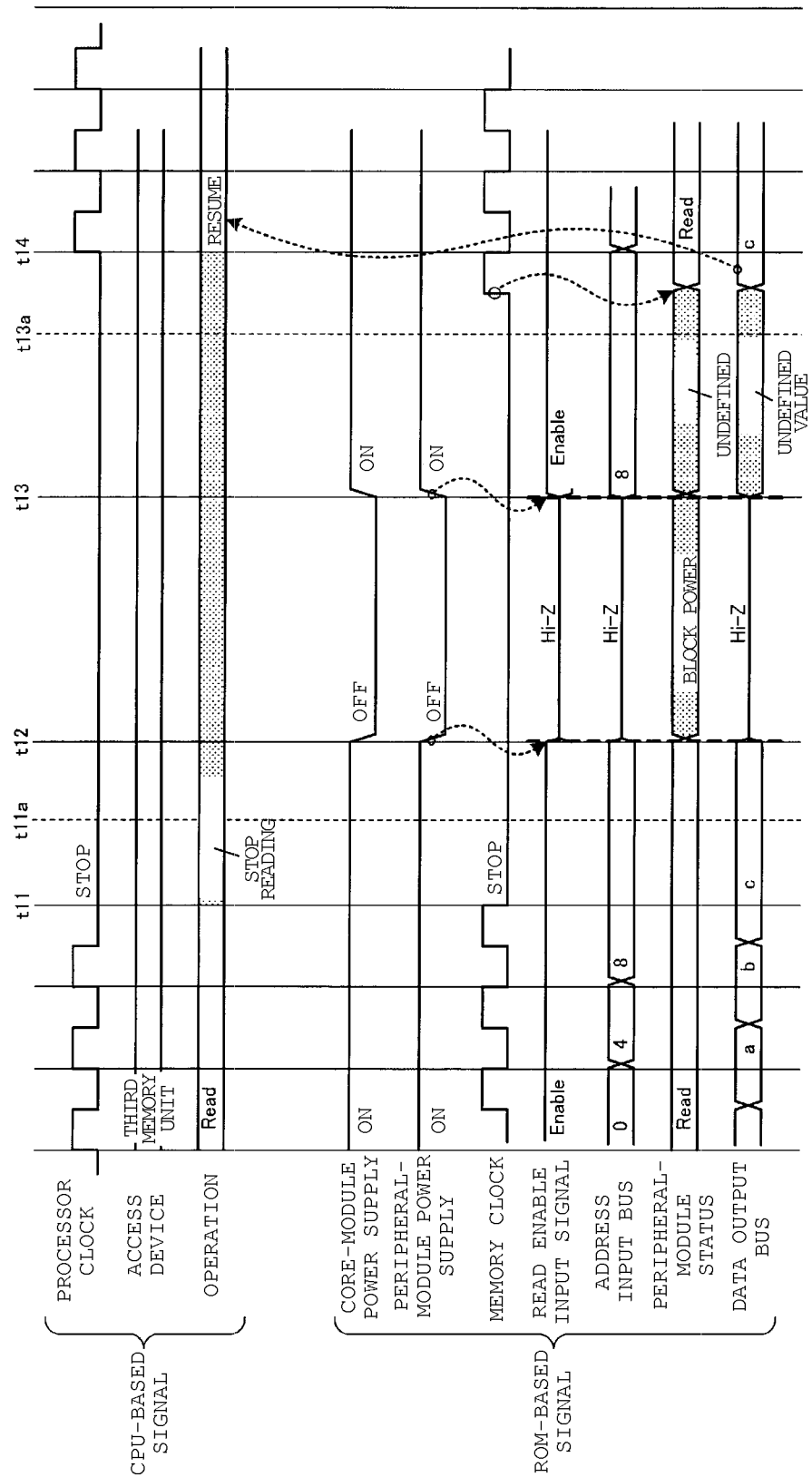
FIG. 8 is a timing chart showing an example of operations at the time of transition to the power saving state and at the time of returning from the power saving state in the wireless communication device according to the second embodiment.

FIG. 8 is a timing chart depicting an example of the operations at the time of transition to the power saving state and at the time of returning from the power saving state in the wireless communication device 1 according to the present embodiment. In the drawing, a read operation (read sequence) is performed up to time t11, a transition operation to the power saving state is performed from the time t11 to a time t12, and a return operation from the power saving state is performed from a time t13 to a time t14.

First, the CPU 11 performs read access on the third memory unit 21 in synchronization with the processor clock. In this case, the CPU 11 accesses the third memory unit 21 by generating the read enable signal to the command input bus and providing addresses (0, 4, and 8) which are read destinations to the address input bus.

Meanwhile, in the third memory unit 21, power is supplied to the core module 211 and the peripheral module 212, and the peripheral module 212 operates in synchronization with the memory clock. The peripheral module 212 is in a read state in response to the input of the read enable signal, and reads data items from the addresses "0", "4", and "8" of the third memory unit 21 provided by the address input bus. Data items "a", "b", and "c" read from the addresses are sequentially output to the CPU 11 through a data output bus L6.

When the transition instruction to the power saving state is received at the time t11 when the data "c" is output, the clock control unit 14 stops the processor clock and stops the memory clock. Accordingly, the read sequences of the CPU 11 and the third memory unit 21 are stopped.

Thereafter, when the power control unit 13 switches the switch SW off at the time t12, the supply of the power to the third memory unit 21 is blocked, and the transition to the power saving state is complete. When the transition to the power saving state is completed, the read enable signal and the address input bus have high impedance in the third memory unit 21. The data output bus also has high impedance.

Subsequently, when the return instruction from the power saving state is received at the time t13, the power control unit 13 starts (resumes) the supply of the power to the third memory unit 21 by switching the switch SW on. Immediately after the time t13, that is, immediately after the supply of the power is started, the third memory unit 21 (peripheral module 212) is in an undefined state, and the data output bus is also undefined.

Thus, the clock control unit 14 performs control such that the state of the peripheral module 212 is defined (stabilized) before the read sequence by the CPU 11 is resumed by supplying the return clock to the third memory unit 21 before the processor clock is supplied.

Specifically, the clock control unit 14 starts the memory clock at a time t13a before the processor clock is supplied. The state of the peripheral module 212 is defined with the memory clock, and the data "c" immediately before the transition to the power saving state occurred is returned to the data output bus L6. The clock control unit 14 returns the CPU 11 to the state before the transition to the power saving state occurred by starting the supply of the processor clock at the time t14. Thus, in the read sequences after the time t14, the stopped data read operation is continued.

As mentioned above, according to the present embodiment, since it is possible to prevent the data of the undefined value from being output from the data output bus at the time of returning from the power saving state, it is possible to appropriately return from the power saving state.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, although it has been described in the example embodiments that the processor of the wireless communication unit 15 or the CPU 11 accesses the memory unit, the example embodiments are not limited thereto. The example embodiments can be applied to a configuration in which another processor such as a direct memory access (DMA) controller accesses the memory unit.

Although it has been described in the wireless communication device 1 according to the example embodiments that two pairs of the pair of the CPU 11 and the first memory unit 12 and the pair of the wireless communication unit 15 (baseband module 153) and the second memory unit 16 are provided, the example embodiments are not limited thereto. For example, the wireless communication device 1 may further include a pair of another processor and another memory unit or a plurality of pairs thereof.

What is claimed is:

1. A wireless communication device comprising:
a plurality of processors;
a plurality of memories, each of which is paired with one of the processors, and is capable of retaining data in a power saving state;
a clock control circuit configured to control when a clock is to be supplied to each pair of the processor and the memory; and
a power control circuit configured to control an amount of power to be supplied to each pair of the processor and the memory, wherein,
in the power saving state, the clock control circuit stops supplying the clock to a pair of the processor and the memory, and the power control circuit reduces the amount of power supplied to the memory of the pair, and when returning transitioning from the power saving state to a normal power state, the power control circuit increases the amount of power supplied to the memory of the pair to a normal level, and then the clock control circuit starts supplying the clock to the memory before starting to supply of the pair, and then starts supplying the clock to the processor of the pair; wherein, when transitioning from the normal power state to the power saving state, the power control circuit reduces the amount of power supplied to the memory of the pair after the clock control circuit stops supplying the clock to the memory of the pair.

2. The device according to claim 1, wherein the memory of the pair includes a core module that retains the data, and a peripheral module that includes a peripheral circuit near the core module, wherein, when transitioning from the normal power state to the power saving state, the power control circuit stops supplying power to the peripheral module after the clock control circuit stops supplying the clock to the peripheral module, and wherein, when returning from the power saving state to the normal power state, the power control circuit starts supplying the power to the peripheral module, and then the clock control circuit starts supplying the clock to the peripheral module and then starts supplying the clock to the processor of the pair.

3. The device according to claim 2, wherein, when transitioning from the normal power state to the power saving state, the power control circuit reduces a voltage supplied to the core module for data retention after the clock control circuit stops supplying the clock to the peripheral module, and wherein, when returning from the power saving state to the normal power state, the power control circuit increases the voltage supplied to the core module for data retention and starts to supply power to the peripheral module, and then the clock control circuit starts supplying the clock to the peripheral module and then starts supplying the clock to the processor of the pair.

4. The device according to claim 3, wherein the clock control circuit starts supplying the clock to the peripheral module in synchronization with a release of the retention mode of the core module for data retention.

5. The device according to claim 1, wherein the clock control circuit and the power control circuit independently perform the transition to the power saving state or the return from the power saving state for each pair of the processor and the memory.

6. The device according to claim 1, wherein the clock control circuit and the power control circuit perform the transition to the power saving state or the return from the power saving state on each pair of the processor and the memory in a coordinated manner.

7. A wireless communication device comprising:
a processor;
a memory;
a clock control circuit configured to start and stop supply of a processor clock to the processor and to start and stop supply of the memory clock to the memory independently of starting and stopping the supply of the processor clock; and
a power control circuit configured to control an amount of power supplied to the memory, wherein when transitioning from a normal power state to a power saving state, the clock control circuit stops the memory clock and the processor clock, and then the power control circuit reduces the amount of power to the memory, and when transitioning from the power saving state to the normal power state, the power control circuit increases the amount of power to the memory, and then the clock control circuit starts the supply of the memory clock to the memory, and then the supply of the processor clock to the processor.

8. The wireless communication device according to claim 7, wherein the memory is a static RAM that includes a peripheral module and a core module; and wherein the power control circuit controls power supplied to the peripheral module and to the core module of the memory separately.

9. The wireless communication device according to claim 8, wherein the power control circuit is configured to start and stop supplying power to the peripheral module while retaining the power supplied to the core module.

10. The wireless communication device according to claim 7, wherein the power control circuit is configured to generate a signal to the memory to enter or exit the power saving state.

11. The wireless communication device according to claim 10, wherein the power control circuit is configured to generate the signal to the memory before reducing the power supplied to the memory.

12. The wireless communication device according to claim 10, wherein the power control circuit generates the signal to the memory in response to an instruction.

13. The wireless communication device according to claim 7, wherein the memory is a non-volatile memory that includes a peripheral module and a core module; and wherein the power control circuit controls power supplied to the peripheral module and to the core module of the memory together.

14. The wireless communication device according to claim 13, wherein the power control circuit is configured to start and stop the power supplied to both the core module and the peripheral module of the non-volatile memory.

15. A method of controlling power in a wireless communication device that includes a memory and a processor coupled to the memory, the method comprising:
receiving an instruction to transition from a power saving state to a normal state;
in response to the instruction, restoring power to the memory;
starting to supply a memory clock to the memory after the power to the memory is restored; and
starting to supply a processor clock to the processor after starting to supply the memory clock
receiving an instruction to transition into the power savings state from the normal state;
in response to the instruction to transition into the power saving state, stopping supplying the processor clock to the processor and the memory clock to the memory; and
reducing power supplied to the memory after stopping the memory clock.

16. The method according to claim 15,
wherein the memory is a static RAM that includes a peripheral module and a core module; and wherein the reducing the power supplied to the memory includes cutting off power supplied to the peripheral module and maintaining power supplied to the core module.

17. The method according to claim 16, further comprising sending a signal to the memory to enter into the power savings state before reducing the power supplied to the memory.

18. The method according to claim 15, wherein the memory is a non-volatile memory that includes a peripheral module and a core module, and wherein reducing the power supplied to the memory includes cutting off power supplied to both the peripheral module and the core module.

* * * * *